United States Patent
Hessler

[15] 3,677,313
[45] July 18, 1972

[54] POWER HAND SAW
[72] Inventor: Henry M. Hessler, Indianapolis, Ind.
[73] Assignees: George J. Pazder, Jr., Greenwood; Alva James Rudkin, Jr., New Whiteland, Ind.; part interest to each
[22] Filed: Jan. 22, 1970
[21] Appl. No.: 4,879

[52] U.S. Cl. .............................. 143/68 F, 144/35 A, 74/50
[51] Int. Cl. ........................................................ B27b 19/08
[58] Field of Search .................. 143/68 E, 60, 63; 74/50; 144/35 A

[56] References Cited
UNITED STATES PATENTS
1,920,687  8/1933  Fleaca ........................................ 74/50
2,282,728  5/1942  Kern ................................ 144/35 A UX
2,713,271  7/1955  Dodegge .................................... 74/50
2,908,971  10/1959  Thomas .............................. 143/68 E X FOREIGN PATENTS OR APPLICATIONS
1,032,030  3/1953  France ................................. 144/35 A Primary Examiner—Donald R. Schran
Attorney—Woodard, Weikart, Emhardt & Naughton

[57] ABSTRACT

A motor powered hand saw. Power is applied by a motor causing a shaft in the hand saw to rotate. The rotating shaft in conjunction with a slide-channel mechanism results in the reciprocation of a cross shaped member. Attached to the cross shaped member is the saw blade.

2 Claims, 4 Drawing Figures

PATENTED JUL 18 1972

INVENTOR
HENRY M. HESSLER
BY
Woodard, Weikart, Emhardt & Naughton
ATTORNEYS

POWER HAND SAW

BACKGROUND OF THE INVENTION

1. Field of the Invention

This invention relates to a motor powered hand saw.

2. Description of the Prior Art

A number of powered hand saws have been conceived. Three such devices are shown in the U.S. Pat. No. 2,492,156 to Kupjack, the U.S. Pat. No. 2,337,769 to Redenbo, and the U.S. Pat. No. 1,834,635 to Overall. These devices provide motion to saw blades through the use of various combinations of gear trains and connecting rods. A number of components are required to facilitate the gear reductions and connections.

The present invention uses a rotating member and slide to accomplish the reciprocating movement of the saw blade. As a result, gears are not required in the present invention and a smaller number of components are required to achieve the reciprocation. The cost of the reciprocating mechanism is less due to the elimination of the previously utilized gear trains. In addition, critical alignment of the mechanism is not required.

SUMMARY OF THE INVENTION

The present invention involves a motor powered hand saw which includes a reciprocating member, a power driven member, and a slide for translating the rotation from the power driven member into the reciprocation of the saw blade. The hand saw also includes a ball bearing assembly providing for smooth rotation of the power driven member. A saw blade clamp is included to facilitate insertion and removal of the saw blade. The hand saw has a handle for grasping and a guide for the saw blade. Openings are provided within the device for accommodation of grease to provide for smooth operation.

It is one object of this invention to provide a motor powered hand saw.

It is another object of this invention to provide reciprocating motion to a saw blade by using a slide-rotating member mechanism.

Another object of this invention is to provide a clamp for insertion and removal of saw blades.

A further object of this invention is to provide openings within the device for accommodation of grease to provide for smooth operation.

Related objects and advantages will be apparent from the drawings, claims and the portion of the specification which follows.

DESCRIPTION OF THE PREFERRED EMBODIMENT

The hand saw may be powered by any type of motor which will impart rotation to a shaft. For example, the typical electrical hand drill may be used to drive the present hand saw. Rotation of the input shaft of the present invention causes a slide to move back and forth and thereby translates the rotational motion into a reciprocating motion.

One possible embodiment is illustrated in FIGS. 1 through 4. Following will be a description of the illustrated embodiment.

Figure 1:
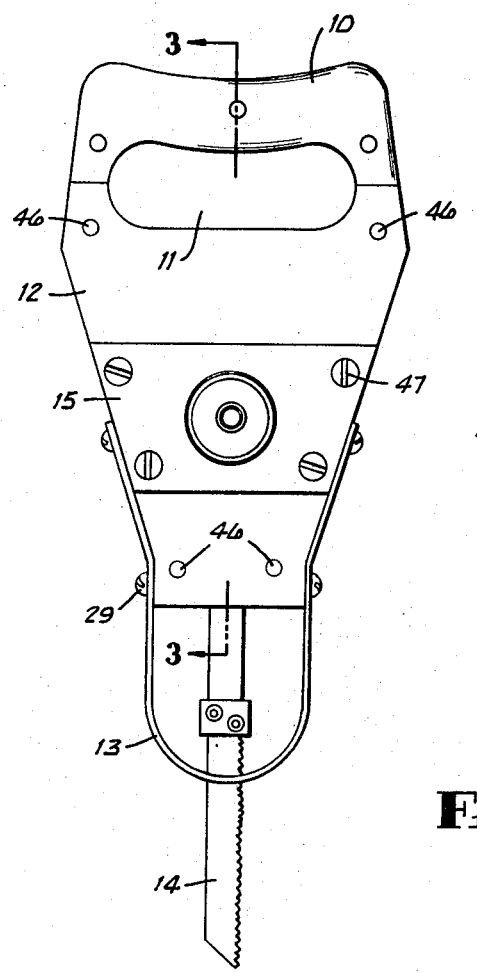
FIG. 1 is a top view of the motor powered hand saw.

FIG. 1 is a top view of the motor powered hand saw. The hand saw is provided with a handle 10 forming an opening 11 so that a person's hand may easily grasp the hand saw. The handle is attached to the main body assembly 12. Also shown is the saw guide 13 and the saw blade 14.

Figure 2:
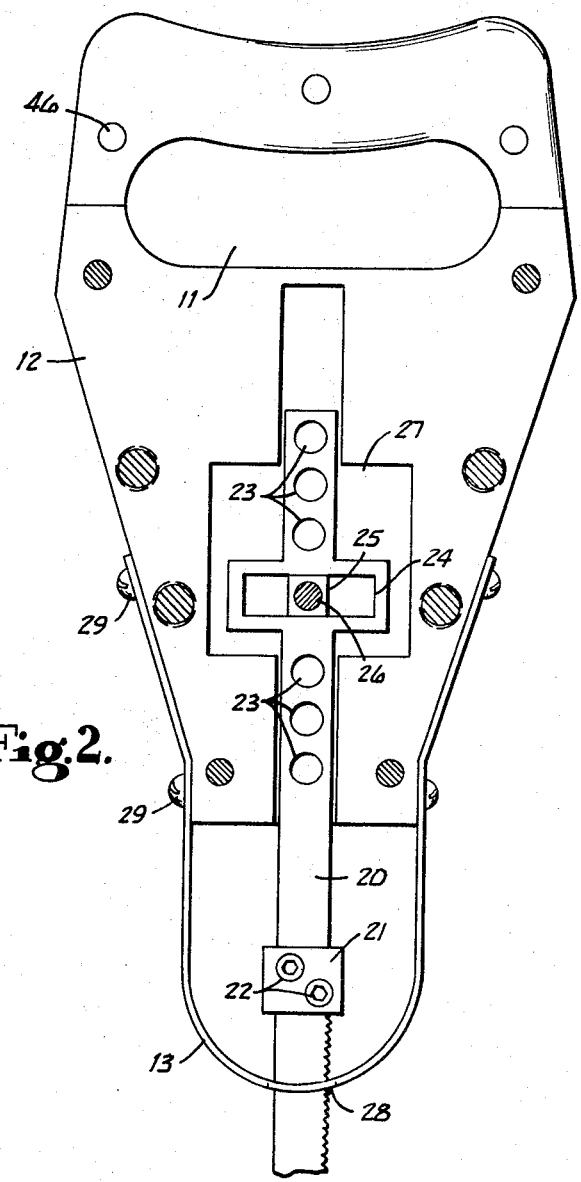
FIG. 2 is the same view as FIG. 1 showing the internal mechanism.
Figure 3:
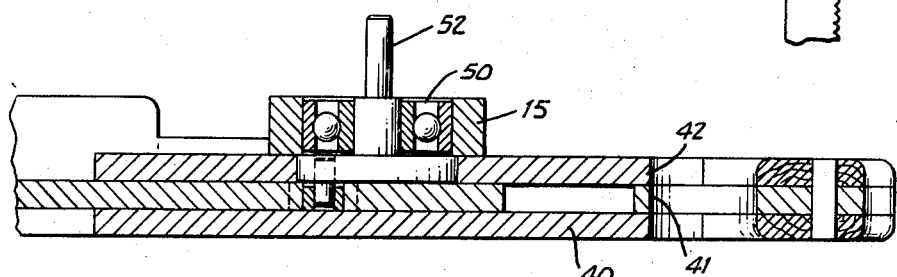
FIG. 3 is a section along line 3—3 of FIG. 1.

FIG. 2 shows the internal mechanism of the hand saw with the top plate 15 and plate 42 removed. The saw blade 14 is attached to a cross shaped reciprocating member 20 by means of a saw clamp 21. The clamp is rectangular in shape and has an opening of sufficient size to receive the saw blade 14 and the reciprocating member 20 in an overlapping position. The clamp has two set screws 21 which hold the saw blade to the reciprocating member. A variety of different types of saw blades for cutting various materials, such as wood or metal, may be used with the present invention.

The cross bar portion of member 20 has a rectangular opening 24 which receives a nut-shaped slide 25. Slide 25 has a hole 26 for receiving pin 56 to be discussed later. Provided in member 20 are six grease holes 23 for accommodation of grease. The grease allows the reciprocating member 20 to easily move back and forth. At the same time, the grease reduces the vibration associated with the reciprocation.

The reciprocating member 20 is housed in a cavity in the main body assembly 12. The main body assembly is composed of bottom plate 40, base plate 41, and plate 42. These three plates plus the handle pieces are secured together by seven rivets 46. The base plate 41 extends to the top of the handle and has an opening 11. The handle 10 is composed of a top and bottom piece typically made from wood or plastic. The two handle pieces extend midway of opening 11 and are fastened to the base plate 41 by three rivets 46. The bottom plate 40 and 42 abut against the lower edges of the two handle pieces and are fastened to base plate 41 by four rivets 46.

The base plate 41 has an opening 27 which allows member 20 to slide in a vertical direction. Plate 42 has a circular opening 43 for receiving the power driven member.

Figure 4:
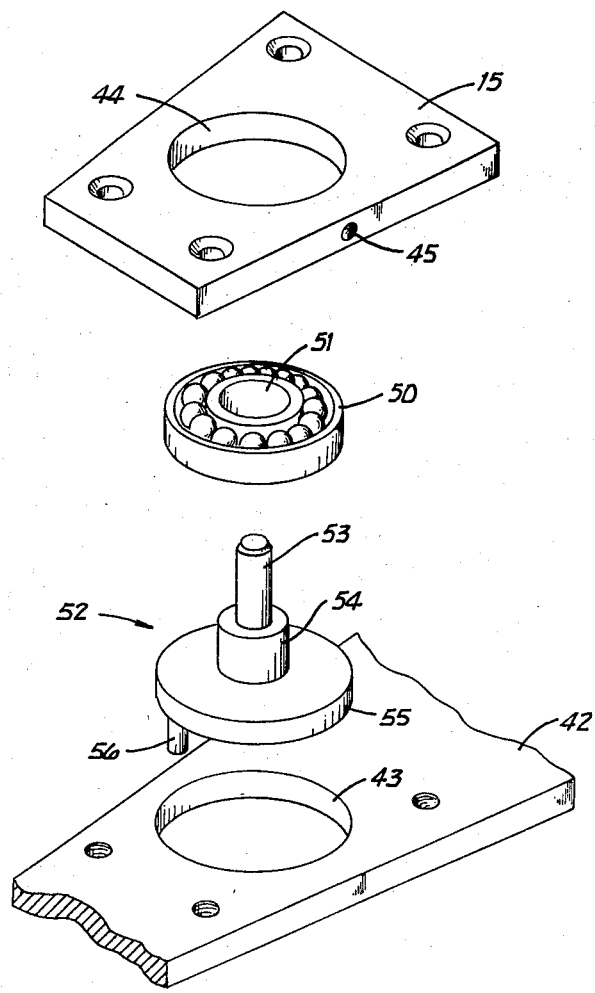
FIG. 4 is an exploded view of the ball bearing assembly, power driven member and associated plates.

FIG. 4 is an exploded view of the power driven member 52, plate 42, ball bearing assembly 50 and the top plate 15. The base 55 of member 52 fits into opening 43 of plate 42 in such a manner that pin 56 extends below plate 42 into opening 26 of slide 25, shown in FIGS. 2 and 3. As shaft 53 of member 52 is rotated by an external motor, the pin 56 causes slide 25 to move back and forth in opening 24 resulting in reciprocation of member 20. Pin 56 may be press fit into base 55.

Member 52 has a bearing step 54 which fits through opening 51 of ball bearing assembly 50. The bearing assembly 50 fits in opening 44 of top plate 15. Set screw 45 is provided in top plate 15 to secure the outer race of ball bearing assembly 50. The top plate 15 is fastened to the main body assembly 12 by four flat head machine screws 47.

Saw guide 13, shown in FIG. 2, has a rectangular opening 28 to allow for passage of saw blade 14. The guide is fastened to main body assembly 12 by eight screws 29.

It will be evident from the above description that the present invention provides a simple and reliable hand saw which may be powered by a number of different types of motors. It will be evident that the reciprocating mechanism is low in cost when compared to the devices previously utilized in power hand saws. It will also be evident that the present invention provides for quick and easy insertion and removal of different types of saw blades.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention and the scope of the claims are also desired to be protected.

I claim:

1. A powered hand saw operably connectable to an external motor comprising a first plate having a cavity and a first and second aligned slot, said first slot extends through one end of said cavity and said second slot extends through an opposite end of said cavity; an elongated reciprocating member extending through said cavity and said first and second slot, said member has a slotted enlarged portion positioned within said cavity during the reciprocation of said member; a saw blade attached to said member; a power driven member having an off centered pin extending into said slotted enlarged portion and a centrally positioned shaft which extends outwardly and externally for direct and removable engagement with said motor; and, means mounted on said plate and bearingly receiving said power driven member; a bottom plate mounted to and beneath said first plate; a top plate mounted atop said first plate and disposed between said means and said first plate, said top plate has an opening receiving said power driven member; and wherein said shaft projects in a direction normal to the direction of reciprocation of said reciprocating member and is disposed between ends of said first plate to receive said motor in a sideways relationship with respect to the saw, said first plate has a handle opening formed in an end opposite the location of said saw blade.

2. The powered hand saw of claim 1 additionally comprising:
- a saw blade clamp, securing said saw blade to said reciprocating member;
- a slotted saw blade guide having a band with opposite ends each fixedly connected to said first plate, said bottom plate and said top plate and having said saw blade extending freely therethrough; and wherein:
- said reciprocating member has a plurality of holes for receiving grease to lubricate said reciprocating member with respect to said top plate and said bottom plate.

* * * * *